United States Patent
Mulvaney

(10) Patent No.: US 6,622,993 B2
(45) Date of Patent: Sep. 23, 2003

(54) HUMIDIFIER INCLUDING OUTPUT EFFICIENCY AND LIQUID LEVEL INDICATORS

(75) Inventor: Patrick T. Mulvaney, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 191 days.

(21) Appl. No.: 09/799,217

(22) Filed: Mar. 5, 2001

(65) Prior Publication Data

US 2002/0189345 A1 Dec. 19, 2002

Related U.S. Application Data

(60) Provisional application No. 60/244,355, filed on Oct. 30, 2000.

(51) Int. Cl.[7] .................................................. B01F 3/04
(52) U.S. Cl. ........................................ 261/107; 73/295
(58) Field of Search ............................... 261/72.1, 107, 261/DIG. 4, DIG. 34; 73/295

(56) References Cited

U.S. PATENT DOCUMENTS

| | | |
|---|---|---|
| 1,625,663 A | 4/1927 | Kelly |
| 2,032,634 A | 3/1936 | Ross |
| 2,211,407 A | 8/1940 | Christensen |
| 2,244,792 A | 6/1941 | Miller |
| 2,424,268 A | 7/1947 | Delano |
| 2,508,530 A | 5/1950 | Morris |
| 2,730,340 A | 1/1956 | Patriarca |
| 2,752,134 A | 6/1956 | Paulus |
| 2,774,581 A | 12/1956 | Bowersox |
| 2,998,714 A | 9/1961 | Bonzer |
| 3,045,450 A | 7/1962 | Chandler |
| 3,253,820 A | 5/1966 | Seil |
| 3,290,021 A | 12/1966 | Blachly et al. |

(List continued on next page.)

FOREIGN PATENT DOCUMENTS

| | | | | |
|---|---|---|---|---|
| JP | 58-158435 | | 9/1983 | |
| JP | 58-158436 | | 9/1983 | |
| JP | 62153637 A | * | 7/1987 | ................. 261/107 |
| JP | 62-194147 | | 8/1987 | |
| JP | 7-332733 | | 12/1995 | |

OTHER PUBLICATIONS

The Healthy Humidifier plus (brochure); Model 33350 Hunter Fan Company; (undated).
Hamilton Beach Humidifier (16 page pamphlet); (undated).

*Primary Examiner*—Robert A. Hopkins
(74) *Attorney, Agent, or Firm*—Akin, Gump, Strauss, Hauer & Feld, L.L.P.

(57) ABSTRACT

A humidifier including a reservoir adapted for retaining liquid and an evaporative media supported in adsorbing contact with the liquid. A reservoir temperature sensor detects a temperature within the reservoir at a low liquid level and provides a reservoir temperature signal indicative thereof. An air inlet temperature sensor detects a temperature of air upstream from the evaporative media and provides an air inlet temperature signal indicative thereof. An air outlet temperature sensor detects a temperature of air downstream from the evaporative media and provides an air outlet temperature signal indicative thereof. A controller determines an operating condition of the humidifier based upon at least one of the reservoir temperature signal, the air inlet temperature signal, and the air outlet temperature signal.

47 Claims, 7 Drawing Sheets

U.S. PATENT DOCUMENTS

| | | |
|---|---|---|
| 3,322,405 A | 5/1967 | Knudson et al. |
| 3,323,784 A | 6/1967 | Fazio |
| 3,598,370 A | 8/1971 | Hoag |
| 3,637,194 A | 1/1972 | Swimmer et al. |
| 3,799,517 A | 3/1974 | Tamm |
| 3,811,661 A | 5/1974 | Procter |
| 3,914,349 A | 10/1975 | Stipanuk |
| 4,028,444 A | 6/1977 | Brown et al. |
| 4,045,523 A | 8/1977 | Goettl |
| 4,056,582 A | 11/1977 | Chow |
| 4,169,261 A | 9/1979 | Alpaugh |
| 4,225,542 A | 9/1980 | Wall et al. |
| 4,234,526 A | 11/1980 | Mackay et al. |
| 4,265,839 A | 5/1981 | Baus |
| 4,284,878 A | 8/1981 | Bartels |
| 4,480,469 A | 11/1984 | Tice |
| 4,563,313 A | 1/1986 | Tsuaki |
| 4,576,013 A | 3/1986 | Sperr et al. |
| 4,698,188 A | 10/1987 | Gutmann |
| 4,753,758 A | 6/1988 | Miller |
| 4,822,533 A | 4/1989 | Steiner et al. |
| 4,865,775 A | 9/1989 | Steiner et al. |
| 4,906,417 A | 3/1990 | Gentry |
| 4,932,218 A | 6/1990 | Robbins |
| 5,014,338 A | 5/1991 | Glucksman |
| 5,015,420 A | 5/1991 | Jones |
| 5,034,162 A | 7/1991 | Chiu |
| 5,037,583 A | 8/1991 | Hand |
| 5,037,586 A | 8/1991 | Mehrholz et al. |
| 5,061,405 A | 10/1991 | Stanek et al. |
| 5,108,663 A | 4/1992 | Chiu |
| 5,110,511 A | 5/1992 | Hand |
| 5,111,529 A | 5/1992 | Glucksman |
| 5,133,904 A | 7/1992 | Pepper |
| 5,143,655 A | 9/1992 | Chiu et al. |
| 5,143,656 A | 9/1992 | Marino et al. |
| 5,250,232 A | 10/1993 | Pepper et al. |
| 5,397,510 A | 3/1995 | Clark |
| 5,483,616 A | 1/1996 | Chiu et al. |
| RE35,153 E | 2/1996 | Chiu |
| 5,490,957 A | 2/1996 | Lasko et al. |
| 5,514,303 A | 5/1996 | Chiu et al. |
| 5,529,060 A | 6/1996 | Salmon et al. |
| 5,529,726 A | 6/1996 | Glenn |
| 5,547,615 A | 8/1996 | Jane et al. |
| 5,573,713 A | 11/1996 | Tomasiak et al. |
| 5,611,967 A | 3/1997 | Jane et al. |
| 5,688,446 A | 11/1997 | Glenn |
| 5,758,018 A | 5/1998 | Fowler, Jr. |
| 5,759,451 A | 6/1998 | Tomasiak et al. |
| 5,783,117 A | 7/1998 | Byassee et al. |
| 5,800,741 A | 9/1998 | Glenn et al. |
| 5,938,984 A | 8/1999 | Jung |
| 5,945,038 A | 8/1999 | Anderson |
| 6,053,482 A | 4/2000 | Glenn et al. |

* cited by examiner

HUMIDIFIER INCLUDING OUTPUT EFFICIENCY AND LIQUID LEVEL INDICATORS

CROSS-REFERENCE TO RELATED APPLICATION

This application claims the benefit of U.S. Provisional Patent Application Serial No. 60/244,355, filed Oct. 30, 2000, the disclosure of which is incorporated herein by reference.

BACKGROUND OF THE INVENTION

1. Field of the Invention

The present invention relates generally to humidifiers and, more particularly, to a system for measuring one or more operating conditions of a humidifier. Moreover, the present invention is directed to a system for detecting the output efficiency of a humidifier and the level of liquid retained within the reservoir of a humidifier.

2. Description of the Prior Art

Various types of humidifiers are utilized to provide moisture to indoor air and thereby modify the relative humidity. Included among such humidifiers are ultrasonic humidifiers, steam humidifiers or vaporizers, and evaporative humidifiers.

Evaporative humidifiers typically include a housing having a reservoir of water and a stationary evaporative media, usually a wick assembly supported within a housing. The reservoir is usually provided in fluid communication with a water tank for providing an extended supply of water. The lower portion of the wick assembly is positioned within the reservoir to absorb water contained therein. Air is blown through an upper portion of the wick assembly, thereby causing evaporation of the water from the wick assembly and subsequent transfer of the evaporated water to the ambient air.

Moreover, water within the wick undergoes a phase change as it adsorbs the heat of vaporization from the ambient air, thereby depressing the temperature of the air, wick and reservoir water. As such, a temperature differential exists between the air inlet and the air outlet of a conventional evaporative humidifier due to the evaporation of water. If a stationary wick assembly is utilized, the level of water within the reservoir should remain relatively constant to provide for both continuous adsorption of water by the wick assembly and sufficient air flow therethrough. An example of an evaporative humidifier is disclosed in U.S. patent application Ser. No. 09/637,484 filed, Aug. 11, 2000, now U.S. Pat. No. 6,427,984 which is assigned to the assignee of the present invention and is incorporated herein by reference.

In the interests of both energy conservation and safety, many humidifiers have control systems that de-energize an electrical output device in response to the water level in the reservoir falling below a certain level. For example, it is well known to provide a float assembly within the water reservoir for deactivating the humidifier when the water level within the reservoir is deficient. The typical float assembly includes a float and a rod extending upwardly from the float. The float rod has traditionally been supported by a stationary retainer either fixed to the inside of the humidifier housing or to a wick support frame. When the water level within the reservoir is adequate, the upper end of the float rod closes an activation switch and the humidifier operates. As the water level falls, the float rod descends, until the rod no longer closes the activation switch, at which point the humidifier is deactivated. An example of such a prior art float assembly is disclosed in U.S. Pat. No. 5,945,038.

Although providing a desired deactivating function, prior liquid level response control systems have typically exhibited certain deficiencies such as high cost, erratic performance, and cumbersome design. Additionally, humidifiers utilizing a conventional float assembly de-energize the humidifier and/or indicate an out of water condition, as soon as the water level is insufficient to create enough buoyancy to close the activation switch. This condition generally occurs well before all of the water has evaporated from the reservoir and wick. As such, a wet or damp wick often rests in standing water for an extended period of time.

Therefore there remains a need in the art for a humidifier including a system for accurately providing an indication of an insufficient water level in a supply reservoir.

Additionally, the prior art fails to provide a system for providing an accurate indication of the operating efficiency of the humidifier. More particularly, as water is evaporated from the wick, minerals and other pollutants contained in the water will typically remain on the surface of the wick. As the wick ages, this plating action reduces the wetted surface area of the wick. Since the amount of heat adsorbed by the water from the ambient air is dependent on the wetted surface area, the overall efficiency of the humidifier will decrease proportionately with the wetted surface area lost as the wick ages. When the output efficiency of the wick reaches a predetermined end of life condition, it is desirable to replace the wick. The prior art humidifiers fail to provide an accurate and reliable system for providing an indication of wick output efficiency and the need to replace the wick.

Therefore, there remains a further need in the art for a humidifier including a system for measuring output efficiency and for providing an indication of the need to replace the wick.

SUMMARY OF THE INVENTION

The humidifier of the present invention includes a reservoir adapted for retaining a liquid. A humidification unit, comprising a blower assembly, is provided for treating ambient air with the liquid. The blower assembly includes a housing, a motor supported by the housing, and a fan supported within the housing and operably connected to the motor. The housing includes an air inlet, an air outlet and an evaporate air flow path extending between the air inlet and the air outlet. An evaporative media is in fluid communication with the liquid within the reservoir and includes a portion extending into the air flow path of the housing.

A reservoir temperature sensor detects a temperature within the reservoir at a predetermined low liquid level and produces a reservoir temperature signal indicative thereof. An air inlet temperature sensor detects a temperature of air prior to the air passing in contact with the evaporative media and produces an air inlet temperature signal indicative thereof. An air outlet temperature sensor detects a temperature of air after the air passes in contact with the evaporative media and produces an air outlet temperature signal indicative thereof. A controller is provided in communication with the reservoir temperature sensor, the air inlet temperature sensor, and the air outlet temperature sensor for receiving the reservoir temperature signal, the air inlet temperature signal, and the air outlet temperature signal, respectively.

The reservoir temperature sensor, the air inlet temperature sensor, and the air outlet temperature sensor may be utilized in various combinations to determine any one or more of the following operational statuses of the humidifier: (i) output efficiency of the evaporative media, (ii) a low liquid condition, (iii) a dry evaporative media condition, and (iv) an aged evaporative media condition. All of these operational statuses or operating conditions may be determined by the controller initially calculating a first differential between the air inlet temperature and the air outlet temperature as indicated by the air outlet temperature signal and the air inlet temperature signal. To arrive at a value for the output efficiency, the controller compares the first differential to a predetermined differential of a new, or fully efficient, evaporative media. The efficiency of the new wick is a function of the structural features and material properties of the humidifier, including the wick, along with operating and environmental conditions. A display provides the user with an indication of the determined output efficiency.

The controller may distinguish between the low liquid condition, the dry evaporative media condition, and the aged evaporative media condition by analyzing the first differential and the reservoir temperature signal. In one embodiment, the controller determines whether the low liquid condition exists by calculating a second differential between the air inlet temperature and the reservoir temperature. When the magnitude of the first differential is not greater than a first predetermined amount and the magnitude of the second differential is not greater than a second predetermined amount, then the air inlet temperature is substantially equal to the reservoir temperature, indicating that the liquid in the reservoir has fallen below the low liquid level. In response, the controller generates a low liquid signal for activating a refill indicator. When the magnitude of the first differential is not greater than a first predetermined amount and the magnitude of the second differential is greater than as a second predetermined amount, then the air inlet temperature is not substantially equal to the reservoir temperature, indicating that the liquid in the reservoir has not fallen below the low liquid level. In response, the controller generates an evaporative media condition signal for activating a replacement indicator.

The first and second predetermined amounts are empirically determined and are dependent upon the structure of the humidifier, including the size and material of the reservoir, and environmental and operating conditions, such as the temperature of ambient air, the relative humidity of ambient air, air flow velocity, evaporative conditions of the wick, and the temperature of the liquid as supplied to the reservoir.

In another embodiment of the humidifier of the present invention, a differential between the air inlet temperature and the reservoir temperature is determined by the controller and compared to a predetermined value. The controller detects the low liquid condition and generates a low liquid signal when the magnitude of the differential is not greater than the predetermined value, thereby indicating that the air inlet temperature is approximately equal to the reservoir temperature. Again, the predetermined value is empirically determined and is based upon the structure of the humidifier, as well as environmental and operating conditions.

In a further embodiment, the controller determines the low liquid condition by comparing a differential between the air outlet temperature and the reservoir temperature to a predetermined value, which again is empirically determined and dependent upon the structure of the humidifier, environmental conditions, and operating conditions. The controller generates a low liquid signal when the magnitude of the differential is greater than the predetermined value, thereby indicating that the air outlet temperature differs substantially from the reservoir temperature.

In yet another embodiment of the humidifier of the present invention, the controller generates a low liquid signal when the reservoir temperature increases by at least a predetermined amount within a predetermined number of periods of elapsed time. In still another embodiment, the controller generates either an evaporative media condition signal or a low liquid signal when the air outlet temperature increases by at least a predetermined amount within a predetermined number of periods of elapsed time. The predetermined amounts of temperature and time are empirically determined and, again, are based upon the structure of the humidifier, as well as environmental and operating conditions.

DETAILED DESCRIPTION OF THE INVENTION

Figure 1:
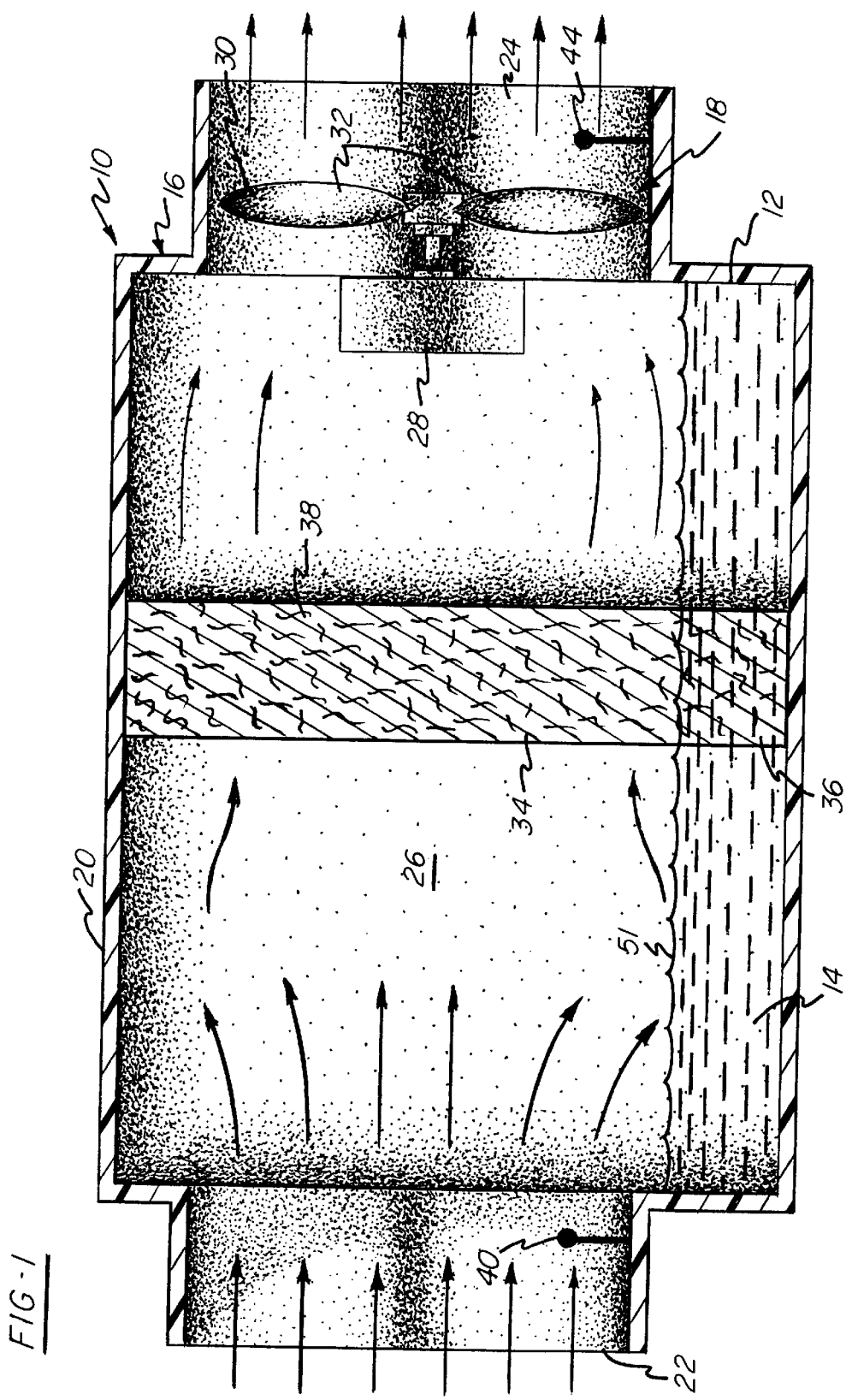
FIG. 1 is a cross-sectional view in partial schematic of the humidifier of the present invention.
Figure 3:
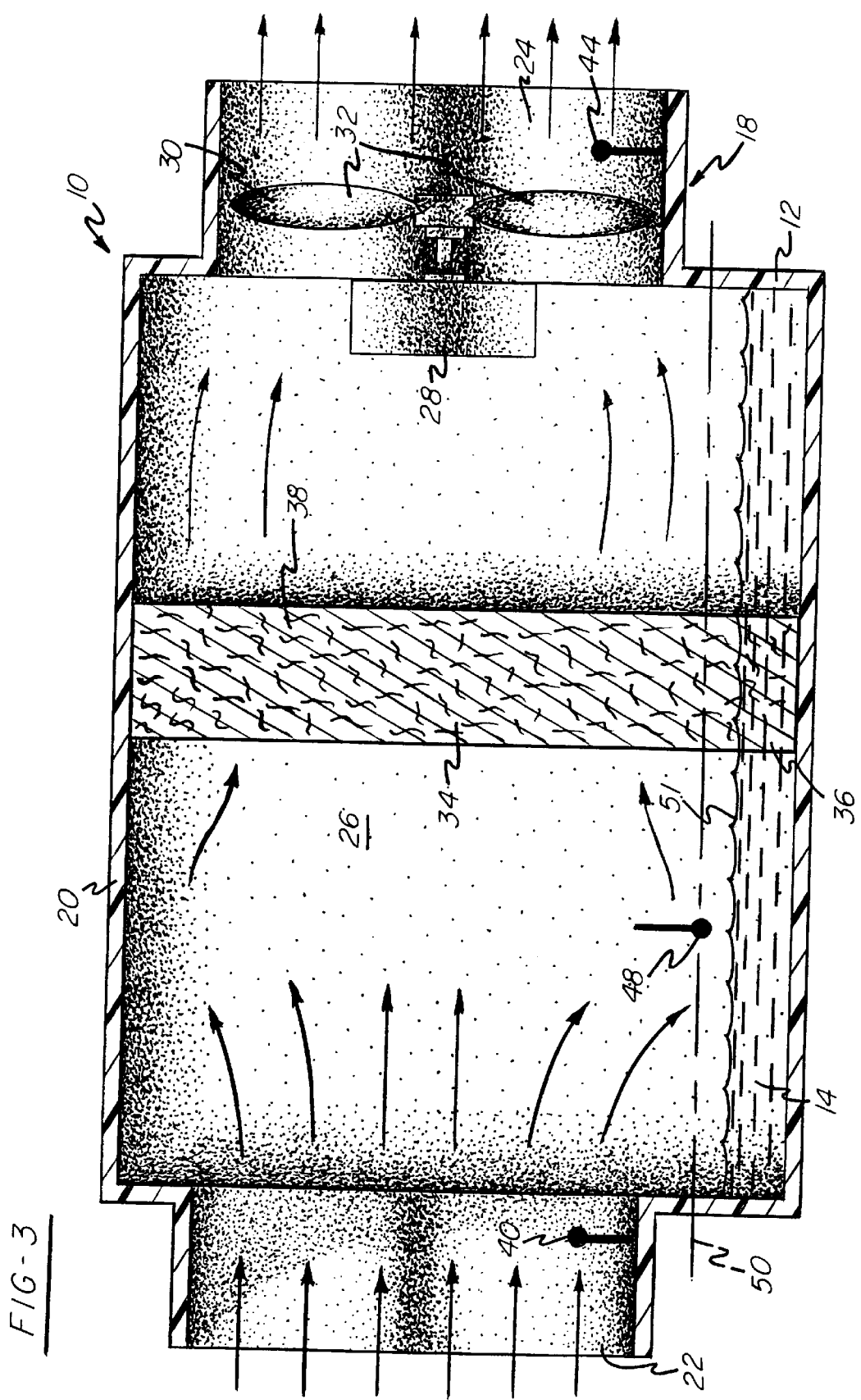
FIG. 3 is a cross-sectional view in partial schematic of the humidifier of FIG. 2, illustrating liquid in the reservoir below a low liquid level.

Referring initially to FIGS. 1 and 3, an evaporative humidifier 10 embodying the invention is illustrated as including a reservoir 12 adapted for retaining a liquid, typically water 14. The water 14 may be supplied through a removable water tank (not shown) of the type well known in the art. A humidification unit 16 is provided and includes a blower assembly 18 comprising a housing 20 defining an air inlet 22 and an air outlet 24. An evaporative air flow path 26 extends between the air inlet 22 and the air outlet 24. The blower assembly 18 further includes a conventional motor 28 supported by the housing 20 and operably connected to a fan 30. The fan 30 includes a plurality of blades 32 for propelling air from the air inlet 22 through the air flow path 26 and out through the air outlet 24.

An evaporative media, in the form of a wick 34, is provided in fluid communication with the water 14 within the reservoir 12. The wick 34 includes a lower portion 36 adapted to be received in adsorbing contact with the water 14 and an upper portion 38 extending upwardly into the air flow path 26 of the housing 20. The wick 34 may be of conventional design as consisting of an expanded cotton-cellulose material, such as that manufactured by Columbus Industries of Ashville, Ohio. More particularly, the wick 34 may have a structure similar to that disclosed in U.S. Pat. No. 5,800,741, the disclosure of which is incorporated herein by reference. While the evaporative media may comprise a wick 34 supported within the reservoir 12, it should be appreciated that other evaporative media may be readily substituted therefore, including, but not limited to, screens, non-wicking filters, and supports for creating a variety of water contact surface areas.

An air inlet temperature sensor 40 is supported by the housing 20 proximate the air inlet 22 upstream from the wick 34. The air inlet temperature sensor 40 detects or measures an inlet temperature ($T_i$) of air prior to the air passing in contact with the wick 34, and produces an air inlet temperature signal 42 indicative thereof. An air outlet temperature sensor 44 is supported by the housing 20 proximate the air outlet 24 downstream from the wick 34. The air outlet temperature sensor 44 detects or measures the outlet temperature ($T_o$) of air exiting the humidifier 10 after the air passes in contact with the wick 34, and produces an air outlet temperature signal 46 indicative thereof.

Figure 2:
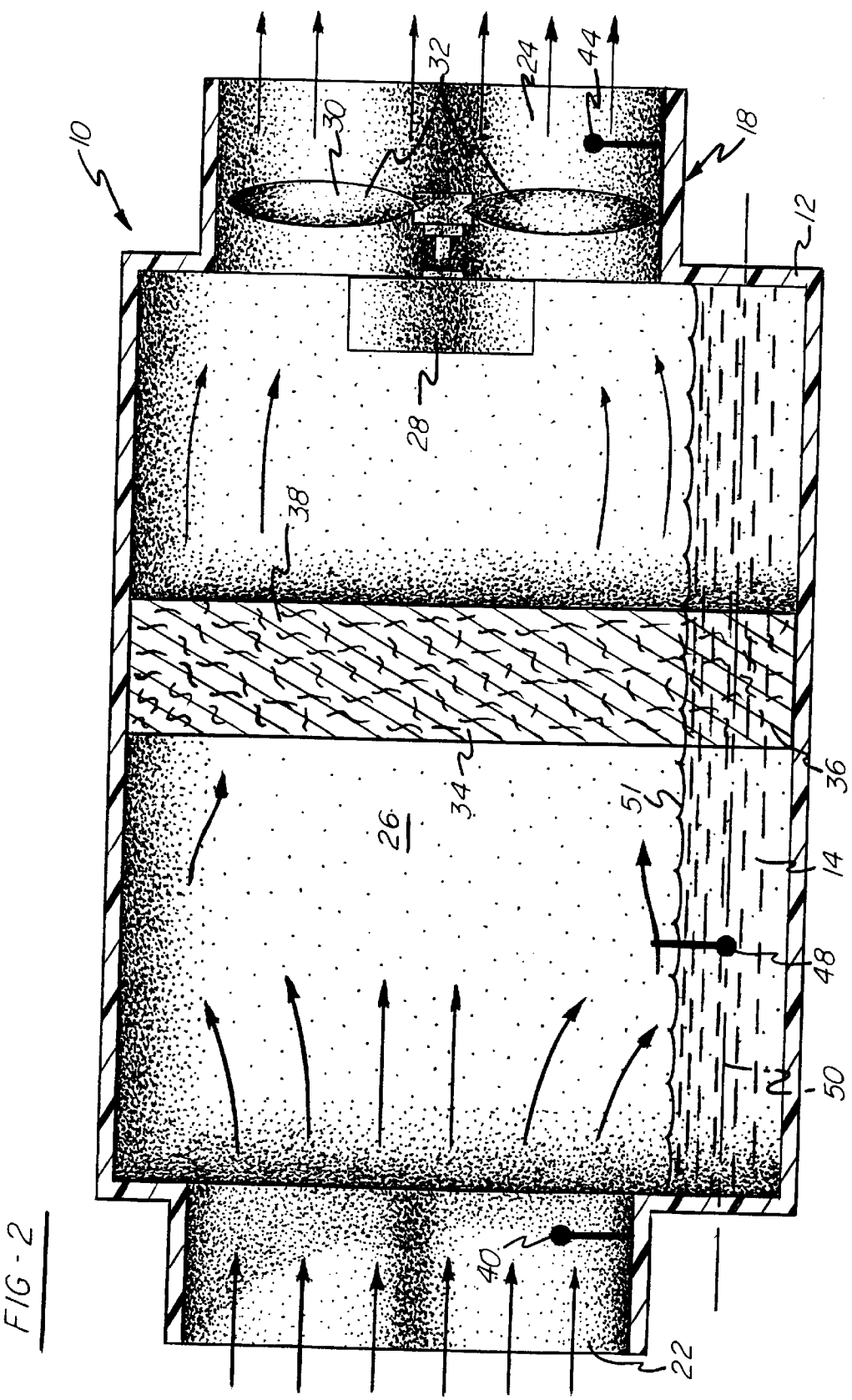
FIG. 2 is a cross-sectional view in partial schematic of an alternative embodiment of the humidifier of the present invention, illustrating liquid in the reservoir above a low liquid level.

In the embodiment of FIGS. 2 and 3, a reservoir temperature sensor 48 is supported within the reservoir 12. The reservoir temperature sensor 48 detects or measures the temperature ($T_r$) within the reservoir 12 at a low liquid level 50 and produces a reservoir temperature signal 49 indicative thereof. As may be appreciated, when a top surface 51 of the water 14 drops below the low liquid level 50, then the reservoir temperature sensor 48 is exposed to the air within the housing 20. While typically positioned for measuring the temperature of air upstream from the wick 34, the reservoir temperature sensor 48 may also be positioned for measuring the temperature of air downstream from the wick 34.

The temperature sensors 40, 44, and 48 may comprise any number of thermistors, non-contact infrared sensors, or other similar temperature sensing devices. Moreover, the temperature sensors 40, 44, and 48 may be embodied within a single sensing device. Further, it should be noted that the temperature sensors 40, 44, and 48 may be positioned either upstream or downstream of the blower assembly 18.

The air inlet temperature sensor 40, the air outlet temperature sensor 44, and the reservoir temperature sensor 48 are utilized in various combinations to determine any one or more of the following operating conditions of the humidifier: (i) output efficiency of the wick 34, (ii) a low liquid condition in the reservoir 12, (iii) a dry wick 34 condition, and (iv) an aged wick 34 condition.

Figure 4:
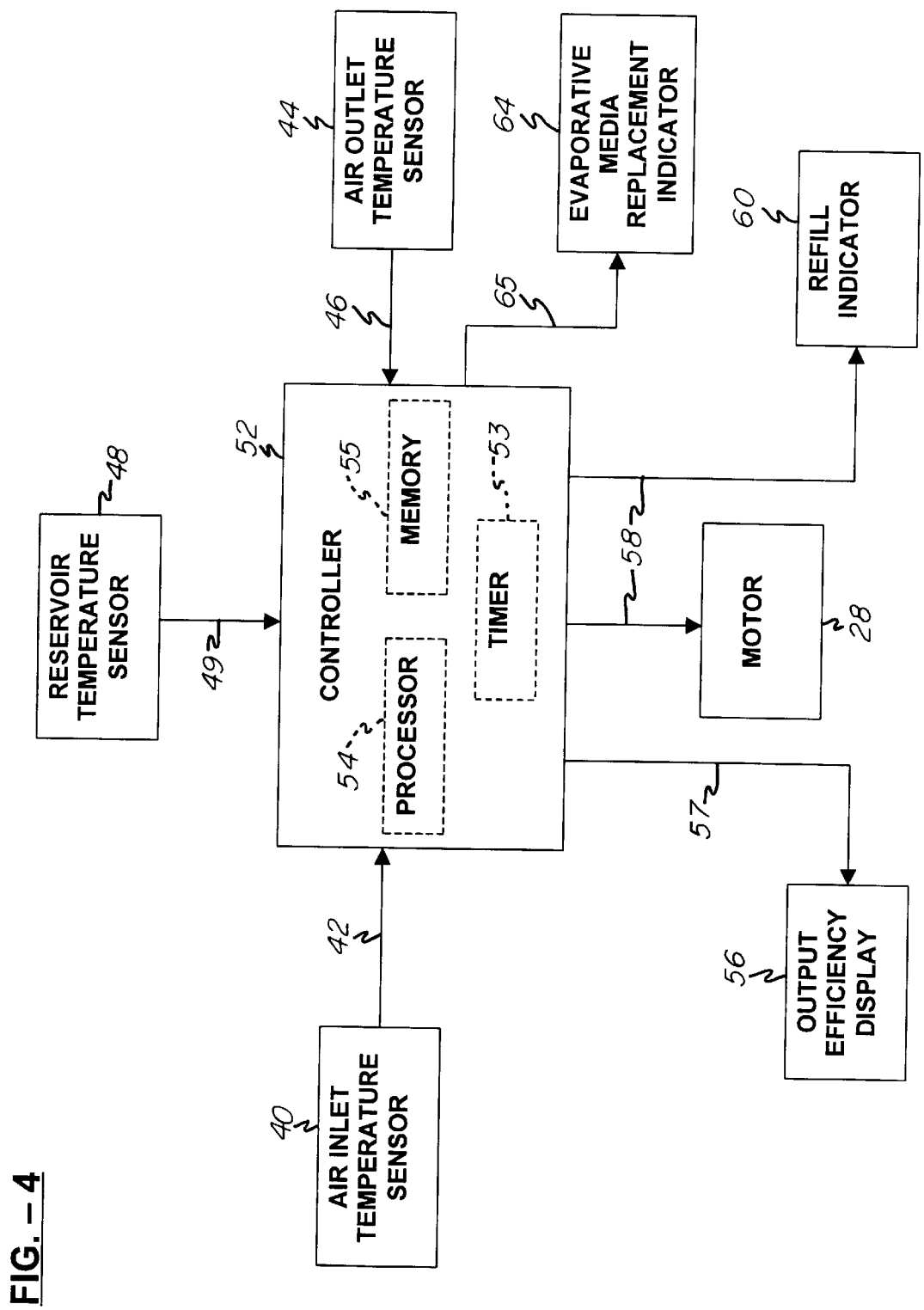
FIG. 4 is a block diagram illustrating the interconnection between various components in one embodiment of the humidifier of the present invention.

With reference now to FIG. 4, the humidifier 10 further includes a controller 52 in communication with the air inlet temperature sensor 40, the air outlet temperature sensor 44, and the reservoir temperature sensor 48. The controller 22 may be either digital or analog and, as such, may comprise a microprocessor, a control circuit or any other device for receiving the temperature signals 42, 46, and 49 and providing an output in response thereto. In one embodiment, the controller 52 includes a conventional counter, or timer 53, for measuring periods of elapsed time, and a processor 54. As illustrated in FIG. 4, the processor 54 may be provided in communication with a memory 55 for the storage of information, more particularly, successive first and second differentials ($\Delta T_1$) and ($\Delta T_2$), as detailed below.

The processor 54 of the controller 52 may determine any one or more of the above-identified operating conditions of the humidifier 10 based upon a first calculated differential ($\Delta T_1$) between the outlet temperature ($T_o$) and the inlet temperature ($T_i$) as represented by the air outlet temperature signal 46 and the air inlet temperature signal 42. The output efficiency is calculated by comparing the first calculated differential ($\Delta T_1$) to a predetermined or theoretical first differential of a new, or 100 percent efficient, wick 34. The predetermined efficiency is empirically determined and dependant upon structural features and material properties of the humidifier 10 and the wick 34, together with operating and environmental conditions, including, but not limited to, relative humidity and temperature of ambient air, size and material of the reservoir 14, and capillary properties of the wick 34. An output efficiency display 56 is provided in communication with the controller 52 for displaying output efficiency and may comprise a liquid crystal display (LCD) for displaying either numbers or a bar graph. It may be appreciated that other similar displays may be readily substituted therefor. The controller 52 sends an efficiency signal 57 to the display 56 for providing the appropriate indication to the user.

In the following description, it should be noted that all predetermined amounts or values are empirically determined and are dependent upon structural features and material properties of the humidifier 10, including the wick 34, along with operating and environmental conditions. Such dependencies may include, the temperature of ambient air, the relative humidity of ambient air, air flow velocity, size and material of the reservoir 12, evaporative conditions of the wick 34, and the temperature of the water 14 as supplied to the reservoir 12.

The controller 52 may distinguish between the low liquid condition, the dry wick 34 condition, and the aged wick 34 condition by analyzing the first differential ($\Delta T_1$) together with the reservoir temperature signal ($T_r$). In one embodiment, the processor 54 of the controller 52 may further determine the low liquid condition, as defined when the level of the top surface 51 of the water 14 in the reservoir 12 drops below the low liquid level 50, based upon a second calculated differential ($\Delta T_2$) between the inlet temperature ($T_i$) and the reservoir temperature ($T_r$) as represented by the air inlet temperature signal 42 and the reservoir temperature signal 49. When the controller 52 determines that the magnitude, or absolute value, of the first differential ($\Delta T_1$) is not greater than a first predetermined amount or value ($x_1$) and that the magnitude, or absolute value, of the second differential ($\Delta T_2$) is not greater than a second predetermined amount ($x_2$), then this indicates that the air inlet temperature ($T_i$) is substantially equal to the reservoir temperature ($T_r$) and that the water 14 within the reservoir 12 has fallen below the low liquid level 50. In response, the controller 52 sends a low liquid signal 58 to a refill indicator 60.

The refill indicator 60 may comprise a visual display such as a light emitting diode (LED). Alternatively, the refill indicator 60 may comprise an audible alarm, such as a buzzer, or any similar device capable of providing an indication to the user that water 14 in the reservoir 12 requires replacement. Additionally, the controller 52 may deactivate the motor 28, either immediately or after a time delay, in response to the low liquid signal 58. Deactivation of the motor 28 after a time delay provides for continued operation of the humidifier 10 and ensuring substantial exhaustion of water 14 from the reservoir 12 and wick 34.

In a further embodiment, when the controller 52 determines that the first differential ($\Delta T_1$) is not greater than a first predetermined amount ($x_1$) and that the second differential ($\Delta T_2$) is greater than a second predetermined amount ($x_2$), such that the air inlet temperature ($T_i$) is not substantially equal to the reservoir temperature ($T_r$), then the controller 52 generates an evaporative media condition signal 65 for activating a replacement indicator 64. Such a condition indicates that the water 14 in the reservoir 12 has not fallen below the low liquid level 50.

During normal operation, when both the reservoir 12 and the wick 34 of the humidifier 10 have an adequate supply of water 14, as illustrated in FIGS. 1 and 2, relatively dry ambient air enters the humidifier 10 through the air inlet 22 and passes in contact with the air inlet temperature sensor 40. The air inlet temperature sensor 40 measures the air inlet temperature ($T_i$) and provides an air inlet temperature signal 42 to the controller 52. The air continues through the air flow path 26 and passes through the evaporative wick 34. As noted above, the lower portion 36 of the wick 34 is positioned within the water 14 of the reservoir 12 such that the water 14 is adsorbed and dispersed substantially evenly over the surface of the wick 34 above the top surface 52 of the water 14. As air passes through the wet evaporative wick 34, the water 14 absorbs the heat of vaporization from the air as the water 14 undergoes a phase change from liquid to vapor. As such, this phase change lowers the temperature of the evaporative wick 34, lowers the temperature of the air and raises the relative humidity of the air. The cool, humid air continues through the air flow path 26 and passes in contact with the air outlet temperature sensor 44 which measures the air outlet temperature ($T_o$) and provides an air outlet temperature signal 46 to the controller 52. The humidified air is then exhausted out of the housing 20 through the air outlet 24.

During dry wick operation, when both the humidifier reservoir 12 and the wick 34 are essentially depleted of water 14, dry ambient air enters the housing 20 through the air inlet 22 and passes in contact with the air inlet temperature sensor 40 which measures the air inlet temperature ($T_i$) and provides an air inlet temperature signal 42 to the controller 52. The air continues through the air flow path 26 and passes through the dry evaporative wick 34. As such, the air temperature and humidity remain substantially unchanged as it passes in contact with the wick 34. The dry air continues through the air flow path 26 and passes over the air outlet temperature sensor 44 which measures the air outlet temperature ($T_o$) and provides an air outlet temperature signal 46 to the controller 52. Finally, the air is exhausted through the air outlet 24 of the housing 20.

The first differential ($\Delta T_1$) in temperatures between the air inlet 22 and the air outlet 24, as indicated by the air inlet temperature signal 42 and the air outlet temperature signal 46, may be utilized to determine any of the aforementioned operating conditions of the humidifier 10 including the output efficiency of the wick 34, the low liquid condition, the dry wick 34 condition, and the aged wick 34 condition. For example, during normal operation of the humidifier 10 with an adequate supply of water 14 in the reservoir 12, a large magnitude of the first temperature differential ($\Delta T_1$) will exist between the inlet temperature ($T_i$) and the outlet temperature ($T_o$), as represented by the inlet temperature signal 42 and the outlet temperature signal 46, due to the evaporative cooling from the phase change of water. As the water 14 in the wick 34 is adsorbed from the reservoir 12 and eventually exhausted to define a dry wick condition, the magnitude of the first temperature differential ($\Delta T_1$) between the inlet temperature ($T_i$) and the outlet temperature ($T_o$) decreases and approaches a first predetermined value ($x_1$), typically approximately zero. When this condition occurs, the wick 34 is substantially failing to evaporate water to air passing in contact therewith. At this point, the controller 52 may send the low liquid signal 58 to activate the refill indicator 60.

The predetermined value ($x_1$) is based upon acceptable efficiencies of the wick 34 which correlate with an aged wick 34 condition, where a value of the first temperature differential ($\Delta T_1$) of zero degrees is associated with approximately zero percent efficiency. In turn, the zero percent efficiency correlates with the dry wick 34 condition.

The first differential ($\Delta T_1$) between the inlet temperature ($T_i$) and the outlet temperature ($T_o$), as represented by the inlet temperature signal 40 and the outlet temperature signal 46, is generally utilized to provide an indication of the output efficiency of the humidifier 10, and more particularly of the wick 34. As indicated above, one form of inefficiency occurs when the wick 34 is substantially no longer holding water, i.e. a dry wick condition. A further form of inefficiency occurs as the wick 34 ages and a plating action occurs on the surface of the wick 34 due to minerals contained within the water absorbed therein. These minerals and other contaminants reduce the effective wetted surface area of the wick 34, such that the first differential ($\Delta T_1$) between the inlet temperature ($T_i$) and the outlet temperature ($T_o$), as represented by the air inlet temperature signal 42 and the outlet temperature signal 46, decreases proportionately with the surface area lost due to the wick age, eventually resulting in the aged wick 34 condition. The processor 54 of the controller 52 may compare the magnitude of a predetermined first temperature differential ($\Delta T_1$) for a new, or fully efficient, wick 34 to the magnitude of the current calculated first temperature differential ($\Delta T_1$) to provide an indication of the output efficiency of the wick 34. More particularly, the controller 52 may send the efficiency signal 57 to the display 56 for providing an indication of humidifier efficiency to the user.

In a further embodiment of the humidifier 10, the output efficiency display 56 may be used to provide an indication of the aged wick 34 condition for signaling the user of the need to replace the wick 34. As the magnitude of the first differential ($\Delta T_1$) between the air outlet temperature ($T_o$) and the air inlet temperature ($T_i$) approaches a predetermined value, typically zero, the display 60 may indicate to the user that the wick 34 requires replacement. It may be appreciated that in such a case, the output efficiency display 56 may comprise a light or an audible alarm. Alternatively, the output efficiency display 56 may be supplemented by an additional evaporative media replacement indicator 64 for providing information to the user regarding replacement of the wick 34. The controller 52 may send a replacement signal 65 to the evaporative media replacement indicator 64 for activation thereof.

The reservoir temperature sensor 48 may be utilized to distinguish between the above-identified low efficiency conditions where (i) the reservoir 12 is low in water 14, i.e. low liquid condition, (ii) the wick 34 has been substantially depleted of water 14, i.e. dry wick 34 condition, and (iii) the wick 34 requires replacement, i.e. aged wick 34 condition. If the reservoir temperature signal 49 indicates a reservoir temperature ($T_r$) significantly lower than the inlet temperature ($T_i$) as represented by the air inlet temperature signal 42, then the water reservoir 12 contains water 14. As the water 14 within the reservoir 12 is depleted, the top surface 51 falls below the low liquid level 50, thereby exposing the reservoir temperature sensor 48 to the air in the air flow path 26. As the water in the reservoir 12 evaporates and exposes the reservoir temperature sensor 48, the warmer environmental air temperature is measured by the sensor 48. If the magnitude of the second temperature differential ($\Delta T_2$) between the air inlet temperature ($T_i$) and the reservoir temperature ($T_r$) is no greater than a second predetermined value ($x_2$), typically approximately zero degrees, then the water reservoir 12 is essentially empty and the controller 52 may indicate to the user that the reservoir 12 requires replenishment by sending the low liquid signal 58 to the refill indicator 60.

In a further embodiment of the present invention, the humidifier 10 may utilize the reservoir temperature sensor 48 without the air inlet temperature sensor 40 and the air outlet temperature sensor 44, to determine the low liquid condition. During operation, the reservoir temperature sensor 48 detects reservoir temperatures ($T_r$) that are associated with periods of elapsed time (t) as measured by the timer 53 and stored within the memory 55 of the controller 52. When the top surface 51 of the water 14 within the reservoir 12 drops below the low fluid level 50, then the temperature measured by the reservoir temperature sensor 48 is relatively warm air within the air flow path 26. As such, a substantial increase in temperature ($T_r$) will be indicated by the reservoir temperature signal 49 within a relatively short period of time (t). When the reservoir temperature ($T_r$) increases by a significant predetermined amount within a predetermined number of periods of elapsed time, the controller 52 determines that the water 14 in the reservoir 12 has fallen below the low liquid level 50 and activates the refill indicator 60 in response to the low liquid signal 58.

In another embodiment of the present invention, the humidifier 10 may utilize the air outlet temperature sensor 44, without the air inlet temperature sensor 40 and the reservoir temperature sensor 48, to determine either the low liquid condition or the dry wick condition. The air outlet temperature sensor 44 detects air outlet temperatures ($T_o$) that are associated with periods of elapsed time (t) as measured by the timer 53 and are subsequently stored within the memory 55 of the controller 52. As the wick 34 no longer efficiently evaporates water into the air passing therethrough, the temperature ($T_o$) as indicated by the air outlet temperature signal 46 substantially increases within a relatively short period of time (t). Moreover, when the air outlet temperature signal 46 increases by a substantial predetermined amount within a predetermined number of periods of elapsed time, the controller 52 generates either the low liquid signal 58 for activating the refill indicator 60 or the replacement signal 65 for activating the evaporative media replacement indicator 64.

Figure 5:
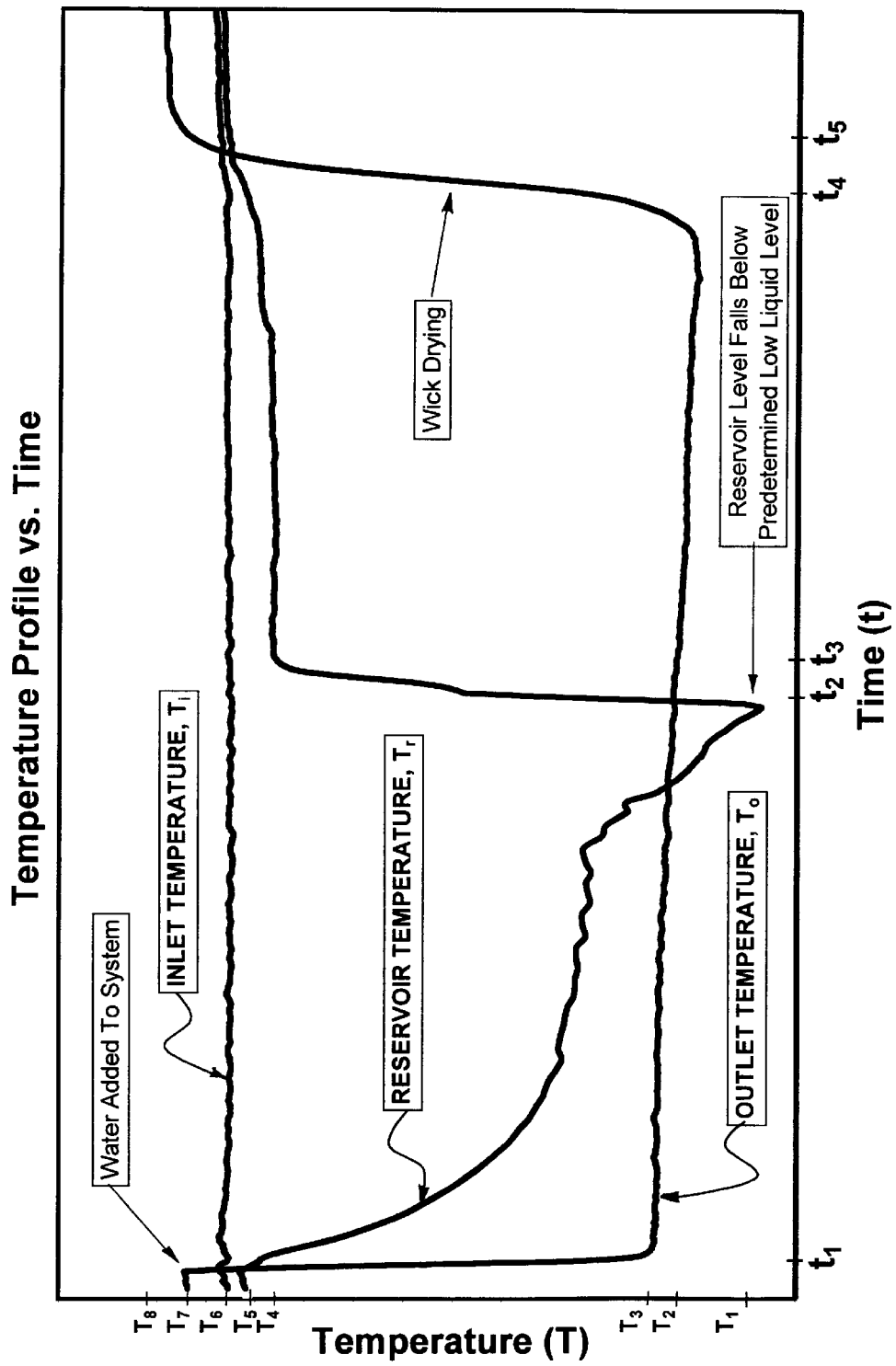
FIG. 5 is a representative graph illustrating temperature as a function of time as detected by the temperature sensors of the humidifier of the present invention.

Turning now to FIG. 5, representative plots of the air inlet temperature ($T_i$), the air outlet temperature ($T_o$), and the reservoir temperature ($T_r$), as indicated by the air inlet temperature signal 42, the air outlet temperature signal 46, and the reservoir temperature signal 49, are illustrated as a function of time (t) for a typical operation of an embodiment of the humidifier 10. The representative points of the plots in FIG. 5 have values as defined in the following tables:

TABLE I

| Time Variable | Time Value (Hrs:Mins) |
| --- | --- |
| $t_1$ | 0 |
| $t_2$ | 3:52 |
| $t_3$ | 4:08 |
| $t_4$ | 7:20 |
| $t_5$ | 7:44 |

TABLE II

| Temperature Variable | Temperature Value (° F.) |
| --- | --- |
| $T_1$ | 55.6 |
| $T_2$ | 57 |
| $T_3$ | 57.9 |
| $T_4$ | 65.7 |
| $T_5$ | 66.1 |
| $T_6$ | 66.5 |

TABLE II-continued

| Temperature Variable | Temperature Value (° F.) |
| --- | --- |
| $T_7$ | 67.4 |
| $T_8$ | 67.9 |

As readily apparent, the inlet temperature ($T_i$) as represented by the air inlet temperature signal 42 typically remains substantially constant during the course of operation of the humidifier 10. Of course, the inlet temperature ($T_i$) will vary depending upon changes to the temperature of ambient air passing through the air inlet 22.

The air outlet temperature ($T_o$) drops from a temperature ($T_7$) to a temperature ($T_3$) as water 14 is added to the reservoir 12. The air outlet temperature ($T_o$) remains substantially constant beginning at time $t_1$ until time $t_4$ at which point the wick 34 begins to lose its moisture content. As the wick 34 continues to dry, the air outlet temperature ($T_o$) dramatically rises from temperature ($T_2$) to temperature ($T_8$) within a relatively short period of time equal to the time differential $t_5$–$t_4$. The air outlet temperature ($T_8$) may be greater than the air inlet temperature ($T_6$) at time ($t_5$) due to heat added from the motor 28 to the air exiting the air outlet 24.

It should be appreciated that the particular values of the air outlet temperature ($T_o$) and time (t) will vary depending upon the structure of the humidifier 10, including the size and material of the reservoir 12, as well as environmental and operating conditions, such as the temperature of ambient air, the relative humidity of ambient air, air flow velocity, and evaporative conditions of the wick 34, and the temperature of the water 14 as supplied to the reservoir 12. During experimental operation of an embodiment of the humidifier 10, the temperature differential between ($T_8$) and ($T_2$) was determined to be approximately 10.9° F., while the corresponding time differential ($t_5$–$t_4$) was measured to approximately equal to 24 minutes.

With further reference to FIG. 5, the reservoir temperature ($T_r$) has an initial value of ($T_5$) as indicated by the reservoir temperature signal 45. After addition of water 14 to the reservoir 12, and during subsequent operation of the humidifier 10, the reservoir temperature ($T_r$) gradually lowers until at time ($t_2$) it reaches a temperature of ($T_1$). At time ($t_2$), the water level 51 within the reservoir 12 falls below the predetermined low liquid level 50 as defined by the reservoir temperature sensor 48. At this point in time, the reservoir temperature signal 49 dramatically increases to a temperature of ($T_4$) within a relatively short period of time equal to ($t_3$–$t_2$). As is readily apparent from the plot in FIG. 5, the slope of the reservoir temperature ($T_r$) abruptly changes from a negative value to a large positive value at time ($t_2$). In other words, the reservoir temperature differential ($T_4$–$T_1$), determined to be approximately 10.1° F., is substantially greater than the time differential ($t_3$–$t_2$), determined to be approximately 16 minutes. At time ($t_3$), the reservoir temperature ($T_r$) begins a gradual increase until it approaches the temperature ($T_5$) approximating temperature ($T_6$) of the air inlet 22 as indicated by the air inlet temperature signal 42.

In other words, the controller 52 associates the plurality of measured reservoir temperatures ($T_r$), as represented by the reservoir temperature signals 49, as a function of the plurality of elapsed times (t) for defining a curve of reservoir temperature ($T_r$) having a slope varying with time (t). The slope includes a transition zone, where the slope changes from a negative value to a first positive value at least as great as a predetermined amount, and then to a second positive value less than said predetermined amount. The controller 52 generates the low liquid signal 58 in response to detecting the transition zone of the slope.

Again, the regular temperature (T) and time (t) values for the reservoir temperature ($T_r$) curve are dependent upon the particular structure of the humidifier 10, as well as environmental conditions. However, during experimental operation of the humidifier 10, the time differential ($t_2-t_1$) was determined to be equal to approximately 3 hours, 52 minutes, while the time differential ($t_3-t_2$) was approximately equal to 16 minutes.

Figure 6:
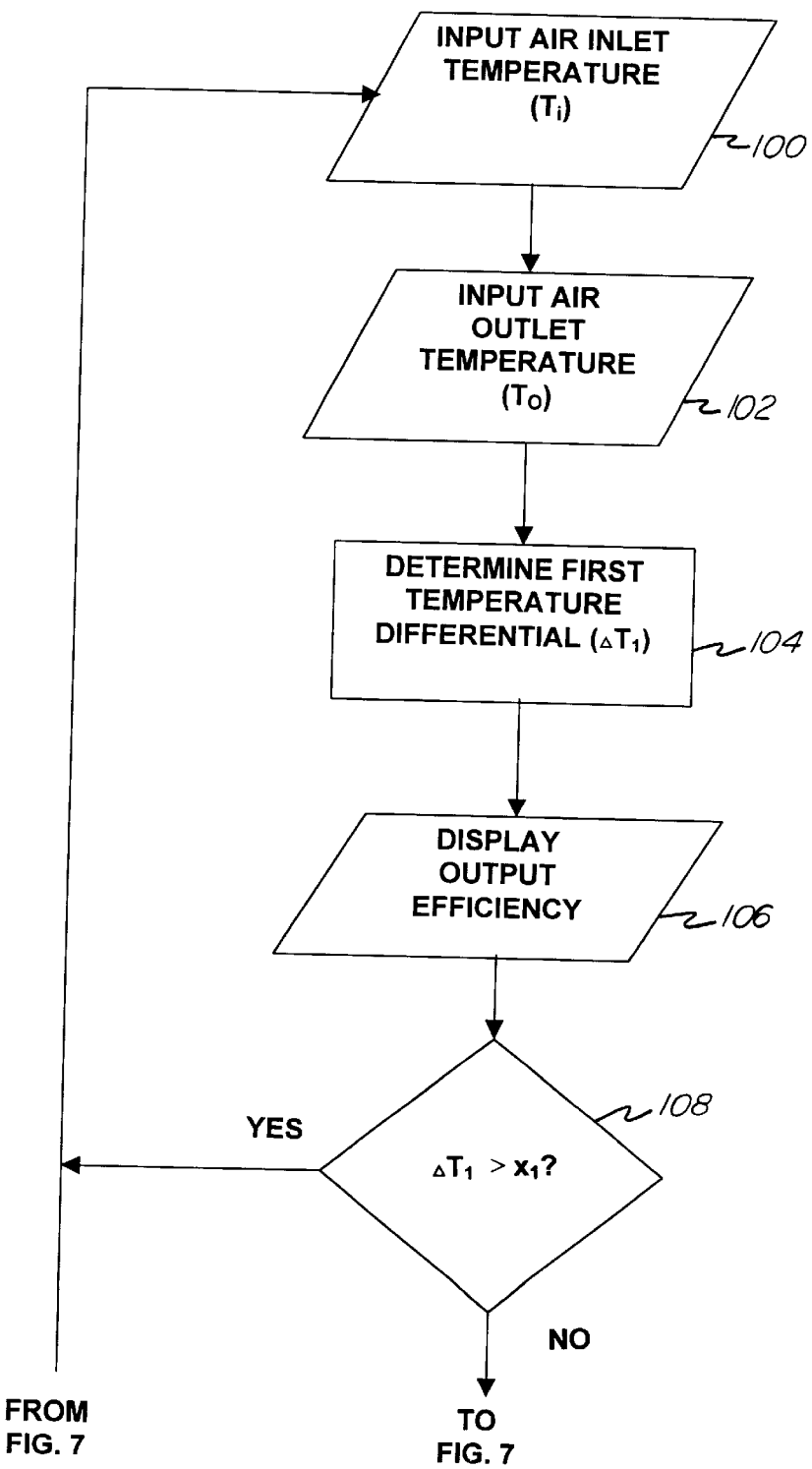
FIG. 6 is a flow chart illustrating a method of operation of the humidifier in the present invention.
Figure 7:
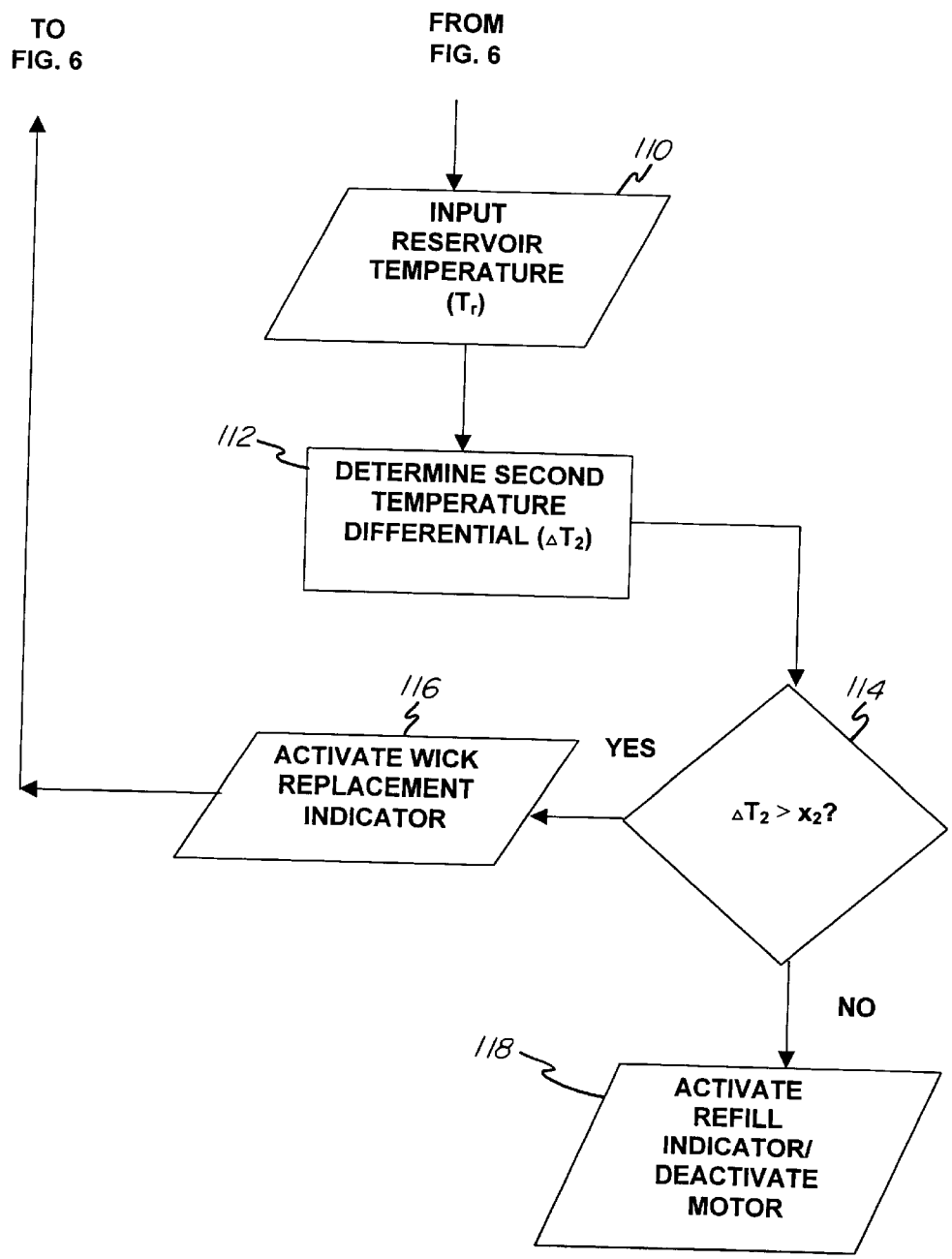
FIG. 7 is a continuation of the flow chart of FIG. 6.

Turning now to FIGS. 6 and 7, the method of operation of an embodiment of the humidifier 10 of the present invention is illustrated. At block 100, the air inlet temperature sensor 40 measures the temperature ($T_i$) of the incoming air proximate the air inlet 22 and provides an air inlet temperature signal 42 to the controller 52. At block 102, the air outlet temperature sensor 44 measures the temperature ($T_o$) of the humidified air exiting the air flow path 26 of the air outlet 24 and provides an air outlet temperature 46 to the controller 52. At block 104, the processor 54 of the controller 52 determines a first differential ($\Delta T_1$) between the air inlet temperature signal 42 and the air outlet temperature signal 46. The controller 52 then stores the first differential ($\Delta T_1$) within the memory 55. At block 106, the controller 52 determines humidifier efficiency and sends the efficiency signal 57 to the output efficiency display 56. The controller 52 at decision block 108 compares the magnitude of the first differential ($\Delta T_1$) to the first predetermined value ($x_1$), which may be substantially equal to zero. If the first differential ($\Delta T_1$) is greater than the first predetermined value ($x_1$), then the process returns to block 100 for the determination of a new first temperature differential ($\Delta T_1$).

Referring further to FIG. 7, if the magnitude of the first temperature differential ($\Delta T_1$) is not greater than the first predetermined value ($x_1$), then the process continues at block 110. At block 110, the reservoir temperature sensor 48 measures the temperature ($T_r$) in the reservoir 12 and provides a reservoir temperature signal 49 to the controller 52. The controller 52 then determines a second temperature differential ($\Delta T_2$) at block 112 based upon the air inlet temperature signal 42 and the reservoir temperature signal 49.

At decision block 114 the controller 52 compares the magnitude of the second differential ($\Delta T_2$) to a second predetermined value ($x_2$), which may be substantially equal to zero. If the magnitude of the second temperature differential ($\Delta T_2$) is greater than the second predetermined value ($x_2$), then this indicates that water 14 remains in the reservoir 12 and that the wick 34 requires replacement. As such, the controller 52 sends the replacement signal 65 which activates the wick replacement indicator 64 at block 116. The process then returns to block 100.

If the controller 52 determines at block 114 that the magnitude of the second differential ($\Delta T_2$) is not greater than or equal to the second predetermined value ($x_2$), then this indicates that the reservoir 12 is substantially out of water 14. As such, the controller 52 sends the low liquid signal 58 to the refill indicator 60 for activation at block 118. Simultaneously, the motor 28 may be deactivated.

It may be appreciated that in one embodiment of the present invention, the refill indicator 60 is not activated until the reservoir 12 is substantially depleted of water 14 and the wick 34 is essentially dry. Therefore, the user is not alerted to refill the reservoir 12 while the wick 34 is still wet. The drying of the reservoir 12 and wick 34 provides an environment which does not facilitate water standing in the reservoir 12 or a wick 34 which is continuously wet.

While the methods herein described, and the forms of apparatus for carrying these methods into effect constitute preferred embodiments of this invention, it is to be understood that the invention is not limited to these precise methods and forms of apparatus, and that changes may be made therein without departing from the scope of the invention, which is defined in the appended claims.

What is claimed is:

1. A method of determining an operational status of a humidifier, said method comprising the steps of:

providing a reservoir adapted to retain a liquid;

providing an evaporative media in fluid communication with said liquid in said reservoir;

measuring an air inlet temperature of air upstream of said evaporative media;

measuring an air outlet temperature of air downstream of said evaporative media;

determining a first differential between said air inlet temperature and said air outlet temperature;

analyzing said first temperature differential to determine the operational status of said humidifier; and generating a visual display of the operational status, the operational status consisting essentially of (i) output efficiency of the evaporative media, (ii) a low liquid condition, (iii) a dry evaporative media condition, and (iv) an aged evaporative media condition.

2. A method of determining an operating condition of a humidifier, said method comprising the steps of:

providing a reservoir adapted to retain a liquid; providing an evaporative media in fluid communication with said liquid in said reservoir;

measuring an air inlet temperature of air upstream of said evaporative media;

measuring an air outlet temperature of air downstream of said evaporative media;

determining a first differential between said air inlet temperature and said air outlet temperature;

analyzing said first differential to determine an operating condition of said humidifier; and generating a visual display of said operating condition, wherein said operating condition is a relative efficiency of said evaporative media, and said step of analyzing said first differential comprises the step of comparing said first differential to a predetermined differential of an efficient evaporative media.

3. A method of determining an operating condition of a humidifier, said method comprising the steps of:

providing a reservoir adapted to retain a liquid; providing an evaporative media in fluid communication with said liquid in said reservoir;

measuring an air inlet temperature of air upstream of said evaporative media;

measuring an air outlet temperature of air downstream of said evaporative media;

determining a first differential between said air inlet temperature and said air outlet temperature;

analyzing said first differential to determine an operating condition of said humidifier; and generating a visual display of said operating condition, wherein said step of analyzing said first differential comprises the step of generating at least one of an evaporative media condition signal and a low liquid signal when said first differential is not greater than a first predetermined amount.

4. A method of determining an operating condition of a humidifier, said method comprising the steps of:
providing a reservoir adapted to retain a liquid;
providing an evaporative media in fluid communication with said liquid in said reservoir;
measuring an air inlet temperature of air upstream of said evaporative media;
measuring an air outlet temperature of air downstream of said evaporative media;
determining a first differential between said air inlet temperature and said air outlet temperature;
analyzing said first differential to determine an operating condition of said humidifier;
generating a visual display of said operating condition,
measuring a reservoir temperature; and
selectively generating a low liquid signal in response to said first differential and said reservoir temperature.

5. The method of claim 4 further comprising the steps of:
determining a second differential between said air inlet temperature and said reservoir temperature;
generating said low liquid signal when a magnitude of said first differential is not greater than a first predetermined amount and when a magnitude of said second differential is not greater than a second predetermined amount; and
generating said visual display in response to said low liquid signal.

6. The method of claim 4 further comprising the steps of:
determining a second differential between said air inlet temperature and said reservoir temperature;
generating a evaporative media replacement signal when said first differential is not greater than a first predetermined amount and when said second differential is greater than a second predetermined amount; and
generating said visual display in response to said evaporative media condition signal.

7. A method of detecting a low liquid level in a humidifier, said method comprising the steps of:
providing a reservoir adapted to retain a liquid;
providing a evaporative media in fluid communication with said liquid in said reservoir;
measuring an air inlet temperature of air upstream of said evaporative media;
measuring a reservoir temperature;
determining a differential between said air inlet temperature and said reservoir temperature;
comparing said differential to a predetermined value; and
generating a low liquid signal when a magnitude of said differential is not greater than said predetermined value.

8. The method of claim 7 further comprising the step of providing a visual display in response to said low liquid signal.

9. A method of detecting a low liquid level in a humidifier, said method comprising the steps of:
providing a reservoir adapted to retain a liquid;
providing a evaporative media in fluid communication with said liquid in said reservoir;
measuring an air outlet temperature of air downstream of said evaporative media;

measuring a reservoir temperature;
determining a differential between said air outlet temperature and said reservoir temperature;
comparing said differential to a predetermined value; and
generating a low liquid signal when a magnitude of said differential is greater than said predetermined value.

10. The method of claim 9 further comprising the step of providing a visual display in response to said low liquid signal.

11. A method of detecting a low liquid level in a humidifier, said method comprising the steps of:
providing a reservoir adapted to retain a liquid;
providing an evaporative media in fluid communication with said liquid in said reservoir;
measuring a reservoir temperature;
measuring a period of elapsed time;
repeating said steps of measuring said reservoir temperature and measuring said period of elapsed time;
determining a reservoir temperature differential;
determining an elapsed time differential; and
generating a low liquid signal when a magnitude of said reservoir temperature differential divided by said elapsed time differential exceeds a predetermined value.

12. The method of claim 11 further comprising the step of providing a visual display in response to said low liquid signal.

13. A method of detecting an operating condition of a humidifier, said method comprising the steps of:
providing a reservoir adapted to retain a liquid;
providing an evaporative media in fluid communication with said liquid in said reservoir;
measuring an air outlet temperature of air downstream from said evaporative media;
measuring a period of elapsed time;
repeating said steps of measuring said air outlet temperature and measuring said period of elapsed time;
determining an air outlet temperature differential;
determining an elapsed time differential; and
generating a signal when a magnitude of said air outlet temperature differential divided by said elapsed time differential exceeds a predetermined value.

14. The method of claim 13 further comprising the step of providing a visual display in response to said signal.

15. The method of claim 13 wherein said signal comprises at least one of an evaporative media condition signal and a low liquid level signal.

16. A humidifier comprising:
a reservoir adapted for retaining a liquid;
a humidification unit for treating ambient air with the liquid, said humidification unit including a housing having an air inlet, an air outlet and an air flow path extending between said air inlet and said air outlet;
an air inlet temperature sensor for detecting an air inlet temperature of air proximate said air inlet and producing an air inlet temperature signal indicative thereof;
an air outlet temperature sensor for detecting an air outlet temperature of air proximate said air outlet and producing an air outlet temperature signal indicative thereof; and
a controller in communication with said air inlet temperature sensor and said air outlet temperature sensor for receiving said air inlet temperature signal and said air outlet temperature signal, said controller comparing said air inlet temperature and said air outlet temperature and generating a first differential in response thereto, said first differential indicative of an operational status of said humidifier, the operational status consisting essentially of (i) output efficiency of the evaporative media, (ii) a low liquid condition, (iii) a dry evaporative media condition, and (iv) an aged evaporative media condition.

17. The humidifier of claim 16 wherein said humidification unit comprises a blower assembly including a housing, a motor supported within said housing, and a fan supported within said housing and operably connected to said motor, said housing including an air inlet, an air outlet and an evaporative air flow path extending between said air inlet and said air outlet.

18. A humidifier comprising:
a reservoir adapted for retaining a liquid;
a humidification unit for treating ambient air with the liquid, said humidification unit including a housing having an air inlet, an air outlet and an air flow path extending between said air inlet and said air outlet;
an air inlet temperature sensor for detecting an air inlet temperature of air proximate said air inlet and producing an air inlet temperature signal indicative thereof;
an air outlet temperature sensor for detecting an air outlet temperature of air proximate said air outlet and producing an air outlet temperature signal indicative thereof;
a controller in communication with said air inlet temperature sensor and said air outlet temperature sensor for receiving said air inlet temperature signal and said air outlet temperature signal, said controller comparing said air inlet temperature and said air outlet temperature and generating a first differential in response thereto, said first differential indicative of an operational status of said humidifier; and
a display in communication with said controller for providing an indication of said operational status.

19. A humidifier comprising:
a reservoir adapted for retaining a liquid;
a humidification unit for treating ambient air with the liquid, said humidification unit including a housing having an air inlet, an air outlet and an air flow path extending between said air inlet and said air outlet;
an air inlet temperature sensor for detecting an air inlet temperature of air proximate said air inlet and producing an air inlet temperature signal indicative thereof;
an air outlet temperature sensor for detecting an air outlet temperature of air proximate said air outlet and producing an air outlet temperature signal indicative thereof; and
a controller in communication with said air inlet temperature sensor and said air outlet temperature sensor for receiving said air inlet temperature signal and said air outlet temperature signal, said controller comparing said air inlet temperature and said air outlet temperature and generating a first differential in response thereto, said first differential indicative of an operational status of said humidifier; and
an evaporative media in fluid communication with said reservoir, wherein said operational status is output efficiency of said evaporative media.

20. The humidifier of claim 19 further comprising an evaporative media replacement indicator selectively activated by said controller.

21. The humidifier of claim 19 wherein said controller generates at least one of an evaporative media condition signal and a low liquid signal when a magnitude of said first differential is not greater than a first predetermined amount.

22. A humidifier comprising:
a reservoir adapted for retaining a liquid;
a humidification unit for treating ambient air with the liquid, said humidification unit including a housing having an air inlet, an air outlet and an air flow path extending between said air inlet and said air outlet;
an air inlet temperature sensor for detecting an air inlet temperature of air proximate said air inlet and producing an air inlet temperature signal indicative thereof;
an air outlet temperature sensor for detecting an air outlet temperature of air proximate said air outlet and producing an air outlet temperature signal indicative thereof; and
a controller in communication with said air inlet temperature sensor and said air outlet temperature sensor for receiving said air inlet temperature signal and said air outlet temperature signal, said controller comparing said air inlet temperature and said air outlet temperature and generating a first differential in response thereto, said first differential indicative of an operational status of said humidifier; and
a reservoir temperature sensor for detecting a reservoir temperature within said reservoir at a predetermined low liquid level and producing a reservoir temperature signal indicative thereof, wherein said controller generates a low liquid signal when said reservoir temperature increases by at least a predetermined amount.

23. The humidifier of claim 22 further comprising a refill indicator in communication with said controller and activated in response to said low liquid signal.

24. A humidifier comprising:
a reservoir adapted for retaining a liquid;
a blower assembly in communication with said reservoir, said blower assembly including a housing, a motor supported by said housing, and a fan supported within said housing and operably connected to said motor, said housing including an air inlet, an air outlet and an evaporative air flow path extending between said air inlet and said air outlet;
an evaporative media in fluid communication with the liquid in said reservoir and including a portion extending into said air flow path;
a reservoir temperature sensor for detecting a reservoir temperature at a low liquid level and producing a reservoir temperature signal indicative thereof;
an air inlet temperature sensor for detecting an air inlet temperature of air prior to passing in contact with said evaporative media and producing an air inlet temperature signal indicative thereof; and
a controller in communication with said reservoir temperature sensor and said air inlet temperature sensor for receiving said reservoir temperature signal and said air inlet temperature signal, said controller determining a differential between said air inlet temperature and said reservoir temperature, said differential indicative of a level of the liquid within said reservoir.

25. The humidifier of claim 24 further comprising a refill indicator in communication with said controller, said refill indicator selectively activated by said controller in response to said differential.

26. A humidifier comprising:

a reservoir adapted for retaining a liquid;

a blower assembly in communication with said reservoir, said blower assembly including a housing, a motor supported by said housing, and a fan supported within said housing and operably connected to said motor, said housing including an air inlet, an air outlet and an evaporative air flow path extending between said air inlet and said air outlet;

an evaporative media in fluid communication with the liquid in said reservoir and including a portion extending into said air flow path within said housing;

a reservoir temperature sensor for detecting a reservoir temperature at a low liquid level and producing a reservoir temperature signal indicative thereof;

an air outlet temperature sensor for detecting an air outlet temperature of air after passing through said evaporative media and producing an air outlet temperature signal indicative thereof; and a controller in communication with said reservoir temperature sensor and said air outlet temperature sensor for receiving said reservoir temperature signal and said air outlet temperature signal, said controller determining a differential between said air outlet temperature and said reservoir temperature, said differential indicative of a level of the liquid within said reservoir.

27. The humidifier of claim 26 further comprising a refill indicator in communication with said controller, said refill indicator selectively activated by said controller in response to said differential.

28. A humidifier comprising:

a reservoir adapted for retaining a liquid;

a blower assembly in communication with said reservoir, said blower assembly including a housing, a motor supported by said housing, and a fan supported within said housing and operably connected to said motor, said housing including an air inlet, an air outlet and an evaporative air flow path extending between said air inlet and said air outlet;

an evaporative media in fluid communication with the liquid in said reservoir and including a portion extending into said air flow path within said housing;

a reservoir temperature sensor for detecting a reservoir temperature in said reservoir and producing a reservoir temperature signal indicative thereof;

an air inlet temperature sensor for detecting an inlet temperature of air prior to passing through said evaporative media and producing an air inlet temperature signal indicative thereof;

an air outlet temperature sensor for detecting an outlet temperature of air after passing through said evaporative media and producing an air outlet temperature signal indicative thereof; and a controller in communication with said reservoir temperature sensor, said air inlet temperature sensor, and said air outlet temperature sensor for receiving said reservoir temperature signal, said air inlet temperature signal and said air outlet temperature signal, said controller determining a first differential between said air outlet temperature and said air inlet temperature, said first differential indicative of output efficiency, said controller further determining a second differential between said air inlet temperature and said reservoir temperature, said second differential indicative of a level of the liquid within said reservoir.

29. The humidifier of claim 28 further comprising a refill indicator in communication with said controller, said refill indicator selectively activated by said controller in response to said first differential and said second differential.

30. The humidifier of claim 28 further comprising a evaporative media replacement indicator in communication with said controller, said evaporative media replacement indicator selectively activated by said controller in response to said first differential and said second differential.

31. A humidifier comprising:

a reservoir adapted for retaining a liquid;

a blower assembly in communication with said reservoir, said blower assembly including a housing, a motor supported by said housing, and a fan supported within said housing and operably connected to said motor, said housing including an air inlet, an air outlet and an evaporative air flow path extending between said air inlet and said air outlet;

an evaporative media in fluid communication with the liquid in said reservoir and including a portion extending into said air flow path within said housing;

a reservoir temperature sensor for detecting a reservoir temperature at a low liquid level and producing a reservoir temperature signal indicative thereof; and a controller in communication with said reservoir temperature sensor for receiving said reservoir temperature signal and for generating in response thereto a low liquid signal when said reservoir temperature increases by at least a predetermined amount, thereby indicating that the liquid in said reservoir has fallen below said low liquid level.

32. The humidifier of claim 31 further comprising a refill indicator in communication with said controller, said refill indicator activated by said controller in response to said low liquid signal.

33. The humidifier of claim 31 further comprising:

an air inlet temperature sensor for detecting an air inlet temperature of air prior to passing through said evaporative media and producing an air inlet temperature signal indicative thereof, said controller in communication with said air inlet temperature sensor for receiving said air inlet temperature signal;

an air outlet temperature sensor for detecting an air outlet temperature of air after passing through said evaporative media and producing an air outlet temperature signal indicative thereof, said controller in communication with said air outlet temperature sensor for receiving said air outlet temperature signal; and wherein said controller determines an output efficiency based upon a first differential between said air outlet temperature signal and said air inlet temperature signal.

34. The humidifier of claim 33 further comprising a display in communication with said controller for providing an indication of said output efficiency.

35. The humidifier of claim 33 further comprising a evaporative media replacement indicator activated by said controller when said output efficiency is not greater than a predetermined level and said controller has not generated said low liquid signal.

36. A humidifier comprising:

a reservoir adapted for retaining a liquid;

a blower assembly in communication with said reservoir, said blower assembly including a housing, a motor supported by said housing, and a fan supported within said housing and operably connected to said motor, said housing including an air inlet, an air outlet and an evaporative air flow path extending between said air inlet and said air outlet;

an evaporative media in fluid communication with the liquid in said reservoir and including a portion extending into said air flow path within said housing;

a reservoir temperature sensor for detecting a temperature in said reservoir at a predetermined low liquid level and producing a reservoir temperature signal indicative thereof; and a controller for measuring periods of elapsed time, said controller in communication with said reservoir temperature sensor for receiving a plurality of said reservoir temperature signals over a plurality of said periods of elapsed time, said controller associating said plurality of reservoir temperature signals as a function of said plurality of elapsed times for defining a reservoir temperature curve having a slope varying with time, said slope of said reservoir temperature curve including a transition zone for changing from a negative value to a positive value at least as great a predetermined amount and then to a positive value less than said predetermined amount, thereby indicating that the liquid in said reservoir has fallen below said low liquid level, said controller generating a low liquid signal when detecting said transition zone.

37. The humidifier of claim 36 wherein said slope is defined as a ratio of a temperature differential over a time differential, said temperature differential substantially equal to the difference between successive reservoir temperature signals, and said time differential substantially equal to the difference between successive periods of elapsed time.

38. The humidifier of claim 36 further comprising a refill indicator in communication with said controller, said refill indicator activated by said controller in response to said low liquid signal.

39. The humidifier of claim 36 wherein said controller is in communication with said motor, said controller deactivating said motor in response to said low liquid signal.

40. The humidifier of claim 36 further comprising an air inlet temperature sensor for (a) detecting a temperature of air prior to passing through said evaporative media and (b) producing an air inlet temperature signal indicative thereof, said controller in communication with said air inlet temperature sensor for receiving said air inlet temperature signal, wherein said predetermined value of said slope of said reservoir temperature curve is dependent upon a differential between said air inlet temperature and said reservoir temperature.

41. The humidifier of claim 40 further comprising an air outlet temperature sensor for (a) detecting a temperature of air after passing through said evaporative media and (b) producing an air outlet temperature signal indicative thereof, said controller in communication with said air outlet temperature sensor for receiving said air outlet temperature signal, said controller determining an output efficiency based upon a first differential between said air outlet temperature and said air inlet temperature.

42. The humidifier of claim 41 further comprising a display in communication with said controller for providing an indication of said output efficiency.

43. The humidifier of claim 41 further comprising a evaporative media replacement indicator activated by said controller when said output efficiency is not greater than a predetermined level and said controller has not generated said low liquid signal.

44. A humidifier comprising:

a reservoir adapted for retaining a liquid;

a humidification unit for treating ambient air with the liquid, said humidification unit including a housing having an air inlet, an air outlet and an air flow path extending between said air inlet and said air outlet;

an air outlet temperature sensor supported proximate said air outlet, said air outlet temperature sensor detecting a temperature of air and producing an air outlet temperature signal indicative thereof; and a controller for measuring periods of elapsed time and in communication with said air outlet temperature sensor for receiving a plurality of said air outlet temperature signals over a plurality of said periods of elapsed time, said controller generating an output signal when said air outlet temperature signal increases by at least a predetermined amount within a predetermined number of periods of elapsed time.

45. The humidifier of claim 44 wherein said humidification unit comprises a blower assembly including a housing, a motor supported within said housing, and a fan supported within said housing and operably connected to said motor, said housing including an air inlet, an air outlet and an evaporative air flow path extending between said air inlet and said air outlet.

46. The humidifier of claim 45 further comprising an evaporative media in fluid communication with the liquid in said reservoir and including a portion extending into said air flow path.

47. The humidifier of claim 46 further comprising a refill indicator in communication with said controller and activated in response to said output signal.

* * * * *